United States Patent

Valenti

[11] Patent Number: 5,158,996
[45] Date of Patent: Oct. 27, 1992

[54] CHEMICALLY TREATED ANHYDRIDE COPOLYMERS AND CEMENTITIOUS MIXTURES CONTAINING THE COPOLYMERS

[75] Inventor: Salvatore Valenti, Binningen, Switzerland

[73] Assignee: Sandoz Ltd., Basel, Switzerland

[21] Appl. No.: 589,345

[22] Filed: Sep. 27, 1990

Related U.S. Application Data

[63] Continuation of Ser. No. 237,121, Aug. 26, 1988.

[30] Foreign Application Priority Data

Aug. 28, 1987 [DE] Fed. Rep. of Germany ....... 3728786
Jan. 5, 1988 [DE] Fed. Rep. of Germany ....... 3800091

[51] Int. Cl.$^5$ ............................................. C08K 3/34
[52] U.S. Cl. ................................. 524/5; 524/549; 525/327.7; 525/384
[58] Field of Search .................................. 524/5, 549

[56] References Cited

U.S. PATENT DOCUMENTS 4,655,838  4/1987  Koga et al. ............................. 524/5

Primary Examiner—Bernard Lipman
Attorney, Agent, or Firm—Gerald D. Sharkin; Richard E. Vila; Walter F. Jewell

[57] ABSTRACT

The invention relates to organic copolymers in free acid or salt form with recurring units of formula I

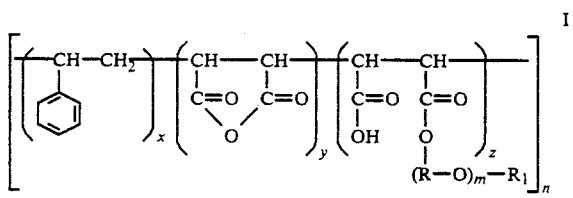

in which
R is an alkylene radical with 2 to 6 carbon atoms,
$R_1$ is a $C_{1-20}$ alkyl-, cycloalkyl- or phenyl group,
x, y and z are numbers from 0.01 to 100,
m is a number from 1 to 100 and
n is a number from 10 to 100, with the provisos, that
i) the ratio of x to (y+z) is from 1:10 to 10:1 inclusive,
ii) the ratio of z to y is from 3:1 to 100:1, and
iii) m+n=15-100.

The products of the invention are excellent superplasticizers and can be used as additives to cementitious mixes.

9 Claims, No Drawings

CHEMICALLY TREATED ANHYDRIDE COPOLYMERS AND CEMENTITIOUS MIXTURES CONTAINING THE COPOLYMERS

This is a continuation of application Ser. No. 07/237,121, filed Aug. 26, 1988.

This invention is concerned with new organic copolymers which can be used as additives to cementitious mixes.

More particularly, the invention relates to new organic copolymers in free acid or salt form containing recurring units of formula I

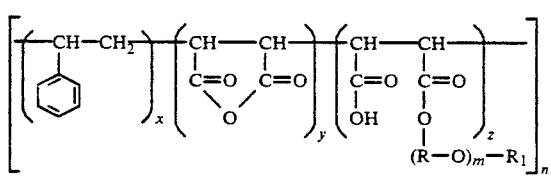

in which
R is an $C_{2-6}$alkylene radical,
$R_1$ is a $C_{1-20}$alkyl-, $C_{6-9}$cycloalkyl-or phenyl group,
x, y and z are numbers from 0.01 to 100,
m is a number from 1 to 100 and
n is a number from 10 to 100,
with the provisos, that
i) the ratio of x to (y+z) is from 1:10 to 10:1 inclusive,
ii) the ratio of z:y is from 3:1 to 100:1, and
iii) m+n=15-100.

It is clear to the man skilled in the art that all numbers given above are average values.

The organic copolymers of styrene and maleic acid anhydride/half ester preferably have an average molecular weight from 9.000 to 100.000, more preferably from 12.000 to 36.000 and preferably have an even distribution of styrene and maleic acid anhydride/half ester units, i.e. the ratio of x to (y+z) is from 1:3 to 3:1, most preferably the ratio of x to (y+z) is 1:1. Most preferred copolymers have an average molecular weight of about 18.000.

In formula I any alkyl or alkylene groups can be linear or branched and each R, independently, is preferably a $C_{2-3}$alkylene group, most preferably each R is the same and is ethylene. Each $R_1$, independently, is preferably $C_{1-2}$ alkyl, more preferably both groups $R_1$ are methyl. m preferably is a number from 7 to 20, most preferably 11-12. In order to have the necessary molecular weight, the copolymers of the invention contain at least 10, preferably from 18 to 40 structural units of formula I, i.e. n is preferably a number from 18 to 40. This means that the sum of m+n preferably is a number from 25 to 80. The acid groups of the copolymers with structural units of formula I can be in free acid or salt form. These salts can be alkali, alkaline earth or (alkyl-)ammonium salts. Preferably these copolymers are in the form of alkali, especially sodium salts.

Organic copolymers with structural units of formula I can be produced by methods well known in the art, e.g. by reacting a copolymer having recurring units of formula II

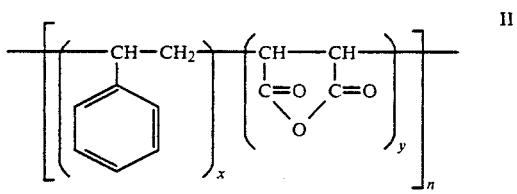

with compounds of formula III $$R_1-O-(R-O)_m-H \qquad III$$

and optionally reacting the resulting copolymer with an alkali or alkaline earth base or with ammonia or with an alkylamino compound. Depending on the amounts used the reaction of the maleic acid anhydride groups in the copolymer containing recurring units of formula II with the polyakylene glycol of formula III can be substantially complete or incomplete, i.e. more or less anhydride groups will subsist in the final copolymer. A 100% transformation which theoretically can be obtained with equimolar amounts of the reactants will, of course, never be achieved. Preferably almost all units of maleic anhydride in the copolymer of formula II are transformed into half ester units, i.e. the ratio of z:y should be as close to 100:1 as possible which can be controlled by determination of the acid number of the obtained copolymer.

Copolymers containing recurring units of formula II which are obtained by copolymerisation of styrene and maleic acid anhydride are well known and are described for example in C. E. Schildknecht, "Vinyl and related Polymers," John Wiley and Sons, Inc., New York, 1952. Polyakylene glycols of formula III are also well known compounds and are obtained by addition of alkylene oxides, especially ethylene oxide to alkyl- or cycloalkylalkohols or phenols.

The new copolymers with recurring units of formula I are excellent surfactants and can be used to disperse organic and inorganic materials. In particular, they can be used as additives for cementitious mixes.

Cementitious mixes in which the organic copolymers of the invention can be used as additives, are mortars and concretes. The hydraulic binder may be Portland cement, alumina cement or blended cement, for example pozzolanic cement, slag cement or other types, Portland cement being preferred.

The organic copolymers of the invention are added in amounts from 0.01 to 10%, preferably 0.1 to 3% by weight based on the weight of the cement. In such amounts, the organic copolymers of the invention have the property of fluidifying the cementitious mixes to which they have been added and are, therefore, excellent superplasticizers without having to the same extent the air entraining properties of similar copolymers with lower molecular weight.

Further admixtures conventional in cement technology, for example, set accelerators or retarders, frost protection agents, pigments, etc. may also be present in the cementitious mixes of the invention.

The following examples, in which all parts, ratios and percentages are by weight and all temperatures are expressed in degrees Centigrade, illustrate the invention.

EXAMPLE 1

49 Parts of maleic acid anhydride and 2.5 parts of n-dodecylmercaptan are dissolved in 200 parts of isobutylmethylketone and the solution heated to 110° under nitrogen while stirring. At this temperature a solution of 1 part azoisobutyronitrile in 52 parts styrene is added slowly over 1 hour. The reaction is slightlly exothermic. The solvent is evaporated under vacuum (temperature in the solution being 50°-55°) and a pale yellow product is obtained, which is a copolymer having about 25 recurring units of formula

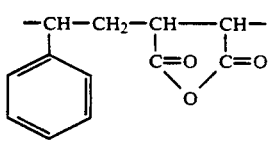

and a molecular weight of about 5000 (determined by measurement of the viscosity, the intrinsic viscosity at 25° in acetone being 0,05 cm$^3$/g).

35 Parts of this product are stirred together with 97 parts of the product with formula V $$CH_3-(OCH_2CH_2)_{12}-OH \qquad V$$

under a nitrogen atmosphere at 180°-190° over 2 hours, giving a brown oil with an acid number of 75-80 indicating complete reaction of the anhydride groups. The molecular weight of the obtained product is about 18.000 (determined by measurement of the viscosity, the intrinsic viscosity at 25° in acetone being 0.15 cm$^3$/g). The oil is dissolved in 306 parts of water and the solution brought to pH 6-7 by addition of caustic soda or triethanolamine. The resulting solution contains a polymer containing about 25 recurring units of formula perature. The resulting brown solution is cooled to normal temperature and the solvent distilled off under vacuum while stirring at an internal temperature of maximum 50°-55°. After about 2 hours 144 parts of methylisobutylketone are recuperated. The resulting oil (about 281 parts) is cooled and 33 parts of sodium hydroxide (30% solution) diluted in 598 parts of distilled water are slowly added. The oil is dissolved rapidly and after stirring another 10 minutes at normal temperature the pH is corrected to 6-7. After addition of about 9.9 parts of tributylphosphate as a foam depressant about 940 parts of a 32% solution (density of 1.05 and viscosity of 22.5 mPa.sec. at 25°) are obtained.

EXAMPLES 2-14

Example 1 is repeated using the starting materials as listed in Table I in which the compounds of formula VI, VII and VIII are $$CH_3(OCH_2CH_2)_4OH \qquad VI$$

$$CH_3(OCH_2CH_2)_7OH \qquad VII$$

$$CH_3(OCH_2CH_2)_{18}OH \qquad VIII$$

which can be prepared by reacting diethyleneglycolmonomethylether with ethylene oxide in appropriate amounts. The styrene-maleic acid anhydride-copolymers are produced either in xylene or in isobutylmethylketone.

APPLICATION EXAMPLE A 0,3% by weight of active substance (based on the weight of cement) of the copolymer of Example 1 is dissolved in 35 parts water and the solution is added to 100 parts Portland cement. The resulting mixture is kneaded by hand over 1 minute, after which the slump

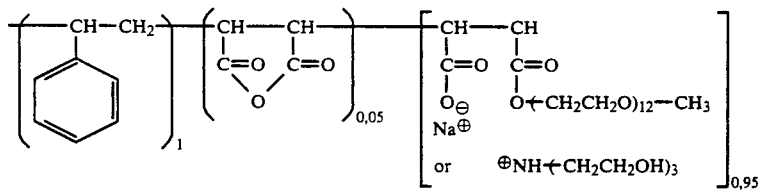

A comparable product is obtained by dissolving 39.2 parts maleic acid anhydride and 4.04 parts dodecylmercaptan in 160 parts methylisobutylketone while stirring. After purging with nitrogen the solution is heated to 110° under a nitrogen atmosphere while stirring. In the course of one hour a solution of 0.8 parts azodiisobutyronitrile in 41.6 parts styrene are added, giving a slightly exothermic reaction. The temperature is, however, kept at 110° and the reaction mixture is further stirred at the same temperature during 2.5 hours, whereafter the heating is stopped and the stirring is continued for another 30 minutes. After cooling to 40°-50° 200 parts of Polyglykol M 500 (a polyethyleneglycolether of Hoechst AG with molecular weight 500, i.e. an average of 11.8 ethylene oxide groups) are added and the mixture heated again to 110° and stirred for 3 hours at this temis determined as a function of time according to the method described in L. M. Meyer and W. F. Perenchio, Concrete International, 36–43, January 1979.

Application example A is repeated using instead of the product of Example 1 the amounts indicated in the last column of Table I of any one of the copolymers of Examples 2 to 14.

In comparison to a cementitious mix prepared under the same conditions with 0,3% by weight of active substance based on the weight of cement, of a commercially available product which is a condensation product of naphthalenesulfonic acid and formaldehyde, the mixes prepared with the products of examples 1-14 have a better slump, especially when considering the value of the slump as a function of time.

TABLE 1

| Example | Maleic acid anhydride part by weight | Styrene | dodecyl-mercaptan weight % of total monomers | molecular weight of styrene-maleic acid anhydride copolymer | $CH_3$—$(OCH_2CH_2)_n$—OH product of formula | molecular weight of endproduct | amount of co-polymer used as a % based on cement |
|---|---|---|---|---|---|---|---|
| 2 | 49 | 52 | — | 20.000 | V | 73.000 | 0,2 |
| 3 | 49 | 52 | 0,25 | 10.000 | V | 36.000 | 0,25 |
| 4 | 49 | 52 | 0,5 | 9.000 | V | 31.500 | 0,3 |
| 5 | 49 | 52 | 1,0 | 8.700 | V | 30.500 | 0,3 |
| 6 | 49 | 52 | 1,5 | 6.700 | V | 23.500 | 0,38 |
| 7 | 49 | 52 | 3,5 | 4.700 | V | 16.000 | 0,4 |
| 8 | 24,5 | 52 | 3,5 | 5.300 | V | 14.000 | 0,37 |
| 9 | 16,3 | 52 | 3,5 | 4.800 | V | 10.500 | 0,4 |
| 10 | 49 | 52 | 2,5 | 5.200 | VI | 10.000 | 0,4 |
| 11 | 49 | 52 | 2,5 | 4.900 | VII | 12.000 | 0,38 |
| 12 | 49 | 52 | 2,5 | 5.000 | VIII | 20.000 | 0,35 |
| 13 | 49 | 39 | 2,85 | 5.100 | V | 20.000 | 0,37 |
| 14 | 49 | 26 | 3,3 | 4.500 | V | 20.000 | 0,4 |

APPLICATION EXAMPLE B

Using Portland cement of Holderbank Rekingen AG (Switzerland) and an aggregate of SAKRET SA, Solothurn (Switzerland) having a specific weight of 2.63 (DIN 4226, part 3, edition April 1983) and k value of 4.54 (Scholz, Baustoffkenntnis, 10th edition, Werner Verlag, page 212) with the following composition: 0-1 mm: 17.7 kg, 1-4 mm: 11.3 kg, 4-8 mm: 9.1 kg, 8-16 mm: 15.0 kg, 16-32 mm: 18.9 kg, concrete mixes are made and their slump measured according to ASTM C 143. Additive A is a commercially available condensation product of naphthalene sulfonic acid and formaldehyde, additive B is the product of Example 1 produced according to the alternative process. The amounts used and the results obtained are summarised in Table 2.

TABLE 2

| Concrete mix no. | Cement kg | Aggregate kg | Water kg | Additive kg | Slump cm |
|---|---|---|---|---|---|
| 1 | 13.44 | 72.0 | 5.38 | 0.109 A | 22.4 |
| 2 | 13.44 | 72.0 | 5.38 | 0.028 B | 22.0 |
| 3 | 13.44 | 72.0 | 6.05 | 0.054 A | 22.1 |
| 4 | 13.44 | 72.0 | 6.05 | 0.021 B | 23.0 |
| 5 | 13.44 | 72.0 | 6.72 | 0.027 A | 21.3 |
| 6 | 13.44 | 72.0 | 6.72 | 0.011 B | 21.8 |

What is claimed is:

1. A process for the improvement of the fluidity of cementitious mixes comprising an hydraulic binder, aggregate and water, comprising adding an organic copolymer with recurring units of formula I

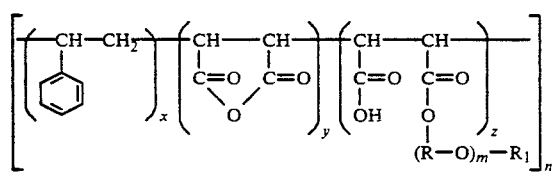

in which
R is an $C_{2-6}$alkylene radical,
$R_1$ is $C_{1-20}$alkyl-, $C_{6-9}$cycloalkyl- or phenyl group,
x,y and z are numbers from 0.01 to 100,
m is a number from 7 to 20,
n is a number from 10 to 100,
with the provisos, that
i) the ratio of x to (y+z) is from 1:10 to 10:1 inclusive,
ii) the ratio of z:y is from 3:1 to 100:1, and
iii) m+n=15-100.

2. Cementitious mixes comprising a cementitious product and a copolymer in free acid or salt form containing recurring units of formula I

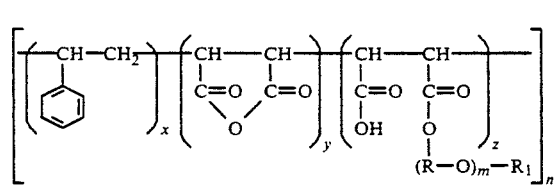

in which
R is an alkylene radical with 2 to 6 carbon atoms,
$R_1$ is a $C_{1-20}$ alkyl-, cycloalkyl- or phenyl group,
x,y and z are numbers from 0.01 to 100,
m is a number from 7 to 20,
n is a number from 10 to 100,
with the provisos, that
i) the ratio of x to (y+z) is from 1:10 to 10:1 inclusive,
ii) the ratio of z:y is from 3:1 to 100:1, and
iii) m+1=15-100.

3. Cementitious mixes according to claim 2, in which the organic copolymer has an average molecular weight from 9000 to 100000.

4. Cementitious mixes according to claim 3, in which the organic copolymer has an average molecular weight from 12000 to 36000.

5. Cementitious mixes according to claim 2, in which in formula I the ratio of x to (y+z) is from 1:3 to 3:1.

6. Cementitious mixes according to claim 2, in which in formula I R is an alkylene radical with 2 or 3 carbon atoms.

7. Cementitious mixes according to claim 2, in which in formula I $R_1$ is a $C_{1-2}$alkyl group.

8. Cementitious mixes according to claim 2, in which in formula I n is a number from 18 to 40.

9. Cementitious mixes according to claim 2, in which the organic copolymer containing recurring units of formula I in which R is an ethylene group, $R_1$ is methyl, the ratio of x to (y+z) 1:1, m is a number 11-12 and n is a number 18-25.

* * * * *